(12) United States Patent
Hoefer et al.

(10) Patent No.: US 7,136,249 B2
(45) Date of Patent: *Nov. 14, 2006

(54) POSITIONING DEVICE

(75) Inventors: Volker Hoefer, Traunreut (DE);
Johann Lahr, Traunwalchen (DE);
Johann Mitterreiter, Chieming (DE);
Gerhard Scheglmann, Ruhpolding (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 133 days.

This patent is subject to a terminal disclaimer.

(21) Appl. No.: 10/969,458

(22) Filed: Oct. 20, 2004

(65) Prior Publication Data

US 2005/0134993 A1    Jun. 23, 2005

(30) Foreign Application Priority Data

Dec. 5, 2003    (DE) ................. 103 57 295

(51) Int. Cl.
*G11B 21/02*    (2006.01)
*G11B 5/596*    (2006.01)

(52) U.S. Cl. ................. 360/75; 360/77.02

(58) Field of Classification Search ... 360/265.2–265.6
See application file for complete search history.

(56) References Cited

U.S. PATENT DOCUMENTS

| | | | | |
|---|---|---|---|---|
| 5,627,698 A | * | 5/1997 | Malek | 360/75 |
| 5,642,943 A | * | 7/1997 | Szeremeta | 384/100 |
| 5,796,542 A | | 8/1998 | Szeremeta | |
| 6,151,185 A | * | 11/2000 | Ishizuka et al. | 360/78.04 |
| 6,933,700 B1 | * | 8/2005 | Lahr et al. | 318/640 |

FOREIGN PATENT DOCUMENTS

EP    0 978 708    7/1999

OTHER PUBLICATIONS

Y. Uematsu; M. Fukuda, *Servo Track Writing Technology*, Fujitsu Sci. Tech. J, 37.2, p. 220-226, Dec. 2001.

* cited by examiner

*Primary Examiner*—K. Wong
(74) *Attorney, Agent, or Firm*—Kenyon & Kenyon LLP

(57) ABSTRACT

A positioning device includes a swiveling shaft, at one end of which an element to be positioned may be attached, a swivel drive, made up of a rotor, which is movable relative to a stator, a position measuring device, made up of two parts movable relative to each other, and a roller bearing, which includes several rolling elements. The rotor of the swivel drive and a first part of the position measuring device are connected to the shaft in a rotatably fixed manner. The rolling elements are made of a ceramic material.

23 Claims, 2 Drawing Sheets

POSITIONING DEVICE

CROSS-REFERENCE TO RELATED APPLICATIONS

The present application claims priority to Application No. 103 57 295.3, filed in the Federal Republic of Germany on Dec. 5, 2003, which is expressly incorporated herein in its entirety by reference thereto.

FIELD OF THE INVENTION

The present invention relates to a positioning device, which may be suitable, for example, for the precise movement of a swivel arm for a servo track writer.

BACKGROUND INFORMATION

Positioning devices of this type are often used in servo track writers (STW), in which the tracks for magnetizable hard disks are formatted or written. For this purpose, a positioning device in the STW swivels a shaft, to which a swivel arm is attached. At its end, a write head is provided, which is ultimately moved by the swivel motion of the shaft and is positioned in a highly precise manner so that as many tracks as possible per unit surface area of the hard disk may be configured. The number of tracks set up per unit surface area or unit diameter (tracks per inch) is a measure for the storage capacity of hard disks. For this reason, efforts are permanently undertaken to achieve a track allocation that is as tight as possible. For a hard disk manufacturer to be able to configure hard disks with a dense track allocation in an economical manner, it must be possible to position the swivel arm of the STW in an exact manner within a very short time (seek and settle time).

The publication "Servo Track Writing Technology" (Fujitsu Sci. Tech. J., 37, 2, pages 220 to 226) of December 2001 describes positioning devices, in which the position of the swivel arm is scanned by a separate scanning unit. In this instance, there is considerable expenditure involved in positioning the scanning unit relative to the swivel arm.

In U.S. Pat. No. 5,796,542, an air bearing is used in a servo track writer to increase the running smoothness and to reduce the seek and settle time. Air bearings of this kind may require a highly precise and costly manufacture and a permanent compressed air supply.

Conventional positioning devices may have the disadvantage that they either have a comparatively costly design and/or may be disadvantageous in terms of precision and seek and settle time.

SUMMARY

According to an example embodiment of the present invention, a positioning device may be provided, which may allow for exceedingly precise positioning as well as very short seek and settle times at comparatively low manufacturing cost and simple operation.

According to an example embodiment of the present invention, the choice of the rolling elements may be decisive for the good functioning, e.g., for reducing the seek and settle time of the positioning device.

The positioning device according to an example embodiment of the present invention may allow for a technically simple and cost-effective construction and exceedingly precise and rapid positioning.

Inaccuracies in the positioning of a swivel arm on a swiveling shaft may be due in no insignificant measure to the elasticity of the rolling elements of the bearing. In conventional bearings, this elasticity causes a comparatively vibration-sensitive or oscillation-prone behavior of the positioning device as a whole. The overall behavior of the positioning device with regard to positioning accuracy and seek and settle time may be improved to an extraordinary degree if the rolling element used in the bearing is made from a ceramic material. Thus, an air bearing may be eliminated if the rolling elements are manufactured from a ceramic material.

The stiffness of the bearing may be increased further if many comparatively small ceramic rolling elements are used in the roller bearings. The mass centers of the rolling elements are arranged in the roller bearing along a circular line. In this connection, the ratio of the circumferential length of the circular line to the number of rolling elements arranged along this circular line may be smaller than 5 mm. This proportion may have a value of less than 3 mm.

The ceramic rolling elements may be arranged between two bearing rings. In this manner, a comparatively short seek and settle time may be achieved, while at the same time holding down the costs for the bearing. In a cost-effective example embodiment, the bearing rings take the form of steel rings.

Alternatively, the rolling elements may also be arranged between two ceramic rings. A shaft supported in this manner may itself be made of a ceramic material. Alternatively, the grooves of the bearing, along which the rolling elements are arranged, may also be an integral part of the shaft and/or of a housing of the positioning device. That is to say that the grooves of the bearing may be worked into the shaft and/or the housing.

The ceramic rolling elements may have the advantage that, even with minimal quantities of lubricant, they still may ensure that the bearing has outstanding tribological properties. Especially in the operation of a positioning device having a swiveling shaft capable of being swivelled by the swivel drive within a swivel range that is smaller than ±180°, in particular smaller than ±90°, this property of the ceramic rolling elements may have a special advantage, particularly since a distribution of lubricant is generally not unproblematic in bearings that are not operated across multiple rotations. Here it may also be considered that in these devices the use of lubricants may be kept to a minimum so as to avoid contaminations for example of the components of the position measuring device.

In the positioning device, the bearing having the rolling elements made of ceramic material may be combined with a high-precision position measuring device so as to bring the advantages of the mechanical upgrade to bear in full measure. In an example embodiment of the present invention, therefore, photoelectric scanning according to the interferential measuring principle may be used.

According to an example embodiment of the present invention, a positioning device includes: a swivel shaft including one end configured to attach to an element to be positioned; a swivel drive including a rotor movable relative to a stator; a position measurement device including two parts movable relative to each other; and a roller bearing including a plurality rolling elements, at least a partial number of the rolling elements made of a ceramic material. The rotor of the swivel drive and a first part of the position measurement device are connected, fixed against relative rotation, with the shaft. Arranged along the shaft, starting from the one end of the shaft, are first the roller bearing, then one of: (a) the first part of the position measuring device; and (b) the rotor. Mass centers of the rolling elements may be arranged along a circular line, and a ratio of a length of a circumference of the circular line to the number of the rolling elements, which are arranged along the circular line, may be smaller than 5 mm, e.g., smaller than 3 mm.

According to an example embodiment of the present invention, a positioning device includes: a swivel shaft including one end configured to attach to an element to be positioned; a swivel drive including a rotor movable relative to a stator; a position measurement device including two parts movable relative to each other; and a roller bearing including a plurality rolling elements, at least a partial number of the rolling elements made of a ceramic material. The rotor of the swivel drive and a first part of the position measurement device are connected, fixed against relative rotation, with the shaft. Mass centers of the rolling elements are arranged along a circular line, a ratio of a length of a circumference of the circular line to the number of the rolling elements, which are arranged along the circular line, is smaller than 5 mm, e.g., smaller than 3 mm.

The swivel drive may include an electrical direct drive.

The swivel drive may include a synchronous direct drive.

The swivel shaft may be swivelable by the swivel drive in a swivel range of less than ±180°, e.g., less than ±90°.

The roller bearing may include two bearing rings made of a metallic material, and the rolling elements may be arranged between the bearing rings.

The bearing elements may be made of $Si_3N_4$.

The position measurement device may be configured to perform photoelectric scanning, e.g., according to an interferential measurement principle.

The first part of the position measurement device and a second part of the position measurement device may include at least one of (a) transparent phase grating and (b) a reflection phase grating.

Further aspects and features hereof are more fully set forth below in the following description of an exemplary embodiment with reference to the appended Figures.

DETAILED DESCRIPTION

Figure 1:
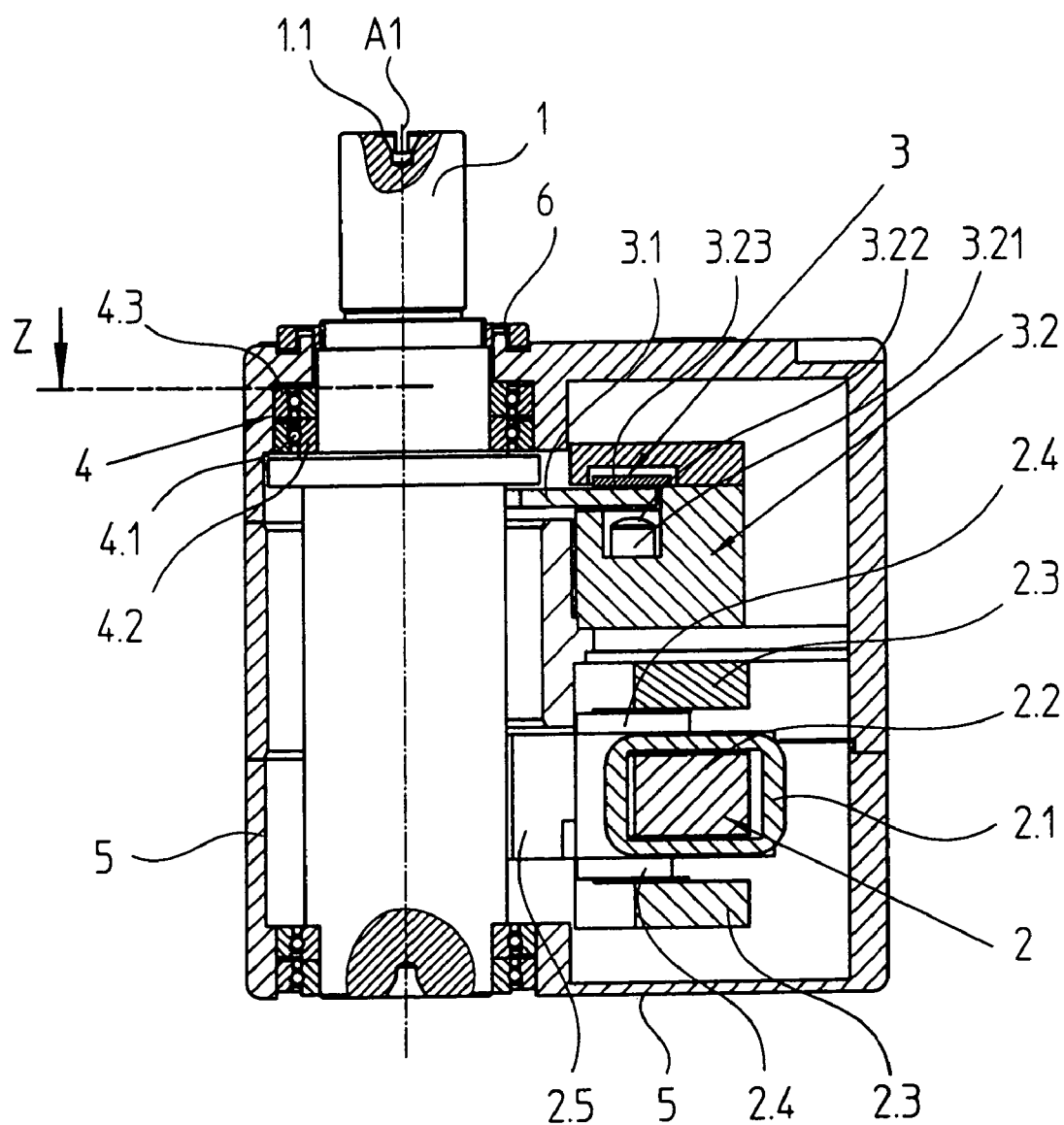
FIG. 1 is a cross-sectional view of a positioning device according to an example embodiment of the present invention.

FIG. 1 illustrates a positioning device as it is used in connection with STWs. According to this drawing, a shaft 1 is able to swivel about an axis A1 and has a shaft end 1.1, to which a swivel arm for writing on a hard disk may be attached. At the passage of shaft 1 through a housing 5 a seal is installed. The shaft 1 in the exemplary embodiment shown is made of steel.

The swivel motion, the exemplary embodiment illustrated allowing for a swivel range of ±25°, is initiated by a so-called voice coil motor 2, an electrical direct drive. The primary part 2.1 of voice coil motor 2, which in the example illustrated works as a rotor within the swivel range, includes a copper coil 2.1 surrounding a ferromagnetic core 2.2. Corresponding to the swivel range, the ferromagnetic core 2.2 extends along the line of a partial circle. The windings of the copper coil 2.1 are arranged such that they are parallel to the drawing plane in FIG. 1. In the operation of voice coil motor 2, ferromagnetic core 2.2 remains stationary, while copper coil 2.1 performs a swivel motion along the partial circle. An intermediate piece 2.5, which is connected to shaft 1 in a rotatably fixed manner, is attached to copper coil 2.1. In this manner, the torque of voice coil motor 2 for the swivel motion is introduced to shaft 1. Copper coil 2.1 and intermediate piece 2.5 may thus be assigned to the primary part or to the rotor of voice coil motor 2.

The secondary part includes permanent magnets 2.4, which are fastened on magnet supports 2.3 made of ferromagnetic material along the partial circle line. In the operation of the positioning device, the secondary part acts like a torque support and does not take part in the swivel motion of shaft 1, and may therefore also be called a stator in the exemplary embodiment illustrated. Voice coil motor 2 may thus work according to the principle of a synchronous direct drive.

The swivel angle of shaft 1 is measured by a position measuring device 3, which may work according to a similar operating principle, as it is described in European Published Patent Application No. 0 978 708, which is expressly incorporated herein in its entirety by reference thereto. Position measuring device 3 thus includes a transparent phase grating 3.1, which has the form of a segment of a ring disk such that the entire swivel range may be scanned. The transparent phase grating 3.1 is connected to shaft 1 in a rotatably fixed manner such that it takes part in the swivel movements of shaft 1.

Opposite from this is the non-swiveling scanning device 3.2 of position measuring device 3. Scanning device 3.2 includes an LED 3.21, a condenser lens 3.22 and a scale segment 3.23 as well as photo detectors for receiving the modulated light beams. Scale segment 3.23 takes the form of a reflection phase grating or a step grating. That is to say that reflecting marks are applied to a reflecting surface, having a height of 0.2 μm in the example illustrated. Due to the fact that scale segment 3.23 does not take part in the swivel movement and thus may always be across from LED 3.21, it may be designed to be small compared to swiveling phase grating 3.1.

In the operation of the positioning device, the light generated by LED 3.21 first passes through condenser lens 3.22 and subsequently through the transparent phase grating 3.1, which generates diffracted beam portions and causes a phase change of the light waves. The light beams thus modified then reach scale segment 3.23 in the form of the reflection phase grating. There they are again diffracted and a further phase change of the light waves occurs. The reflected and diffracted light beams then again pass through transparent phase grating 3.1 and are again diffracted and interfere with each other. The light bundles modulated in this manner then strike photodetectors located in the region of LED 3.21 but not visible in the sectional view of FIG. 1. The photodetectors convert the light signals into electrical signals, which are then suitably processed further to obtain the location information. The use of comparatively small scale segment 3.23 as a non-rotating part may provide that the tolerances with respect to the wobble of scale segment 3.23 may not have to be chosen to be as tight as may be the case if scale segment 3.23 would rotate in operation.

Especially in the use of such a high-resolution interferential position measuring device 3, an optimization of the mechanically acting components may be advantageous for achieving the greatest possible increase in precision and speed of the positioning device as a whole.

Located at shaft 1 within housing 5 are four roller bearings, four identical ball bearings 4 in the exemplary embodiment illustrated, which are combined into two bearing units each having two ball bearings 4. Ball bearings 4 for their part are each made up, among other things, of an inner ring 4.2 and an outer ring 4.2. Inner ring 4.2 and outer ring 4.2 are made of bearing steel. Furthermore, each ball bearing 4 includes balls 4.1 as rolling elements, which are made of ceramic material, in the exemplary embodiment illustrated of $Si_3N_4$. Balls 4.1 have a diameter of only 1.588 mm (1/16 inch).

Figure 2:
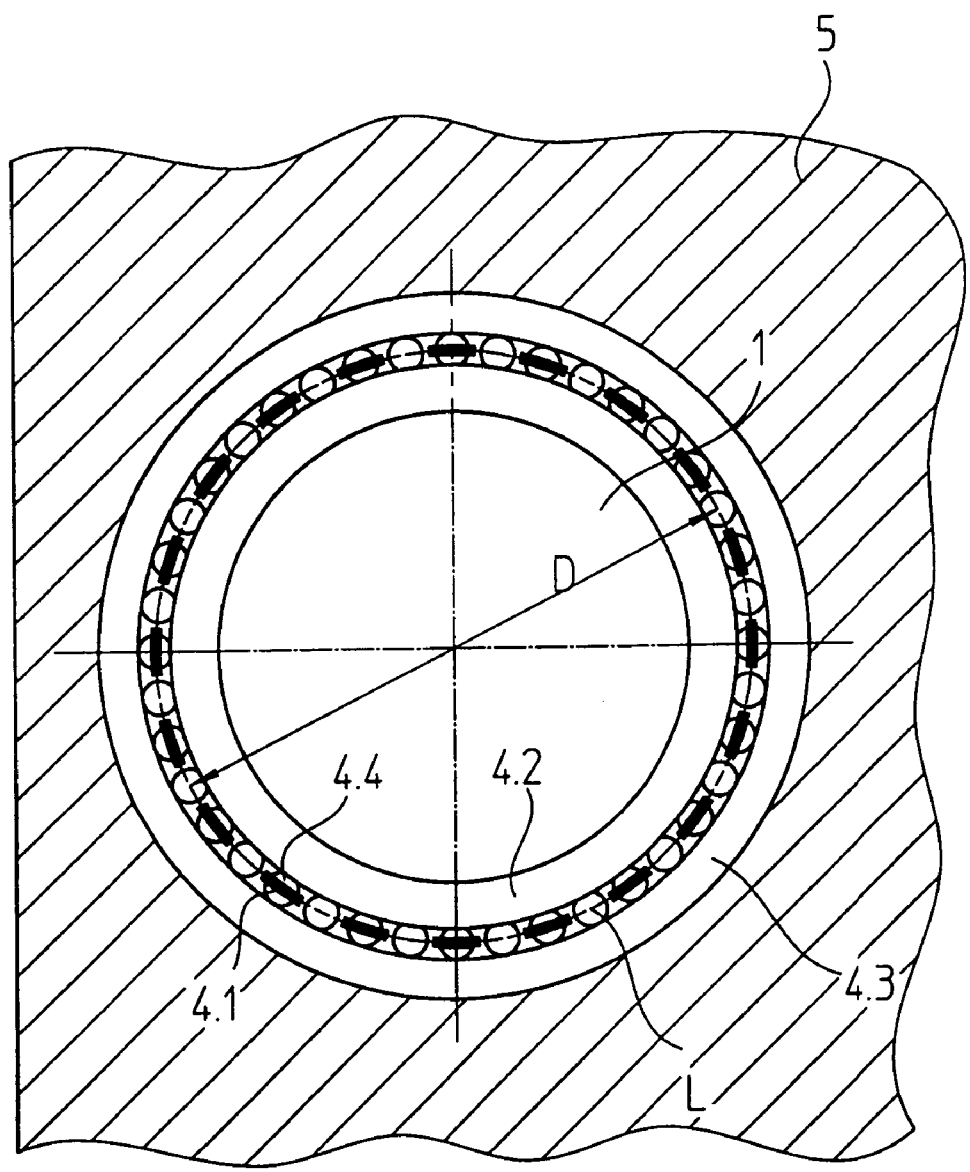
FIG. 2 is a detailed view of a roller bearing built into a housing.

As illustrated in FIG. 2, every second ball 4.1 is surrounded by a ring element 4.4. In ball bearing 4, ring elements 4.4 fulfill the task of a ball cage and are made of PTFE for minimizing friction losses. Balls 4.1 have a mass center which is at their geometrical center point. When these mass centers of balls 4.1 are connected in ball bearing 4, a circular line L is formed. Due to the extremely small diameter of balls 4.1, very many balls 4.1 may be arranged or lined up along circular line L, which may increase the stiffness of the bearing and may reduce the seek and settle time of the servo track writer to a high degree. In the exemplary embodiment illustrated, the diameter D of circular line L measures 27.7 mm, so that the circumference or the length of the circumference of circular line L measures approximately 87.0 mm. Each ball bearing 4, as presented in the example, features a number n of forty balls 4.1. Accordingly, the ratio R of the length of the circumference of the circular line L to the number n of balls 4.1 is to be calculated as follows:

$$R=L/n=87 \text{ mm}/40=2.175 \text{ mm}$$

In the exemplary embodiment illustrated, both bearing units, each of which are made up of two ball bearings 4 as already described above, are located comparatively far apart from each other in housing 5. The first bearing unit (the top unit in the Figure) is located on shaft 1 between position measuring device 3 and shaft end 1.1. In other words, starting from shaft end 1.1, first ball bearings 4 of the first bearing unit and then phase grating 3.1 of position measuring device 3 are arranged along shaft 1. Ball bearings 4 of the first bearing unit are thus located between shaft end 1.1 and phase grating 3.1 of position measuring device 3.

Alternatively, example embodiments of the present invention also include arrangements in which copper coil 2.1 and phase grating 3.1 are switched with respect to their arrangement along shaft 1. In this case, corresponding ball bearings 4 of the first bearing unit are then located between shaft end 1.1 and copper coil 2.1.

The second bearing unit (the bottom unit in the Figure) is installed in housing 5 at the end of the shaft 1.1 located across from the shaft end 1.1 to which a swiveling arm may be attached.

What is claimed is:

1. A positioning device, comprising:
   a swivel shaft including one end configured to attach to an element to be positioned;
   a swivel drive including a rotor movable relative to a stator;
   a position measurement device including two parts movable relative to each other; and
   a roller bearing including a plurality rolling elements, at least a partial number of the rolling elements made of a ceramic material;
   wherein the rotor of the swivel drive and a first part of the position measurement device are connected, fixed against relative rotation, with the shaft; and
   wherein arranged along the shaft, starting from the one end of the shaft, are first the roller bearing, then one of:
   (a) the first part of the position measuring device; and
   (b) the rotor.

2. The positioning device according to claim 1, wherein mass centers of the rolling elements are arranged along a circular line, and a ratio of a length of a circumference of the circular line to the number of the rolling elements, which are arranged along the circular line, is smaller than 5 mm.

3. The positioning device according to claim 1, wherein mass centers of the rolling elements are arranged along a circular line, and a ratio of a length of a circumference of the circular line to the number of the rolling elements, which are arranged along the circular line, is smaller than 3 mm.

4. The positioning device according to claim 1, wherein the swivel drive includes an electrical direct drive.

5. The positioning device according to claim 1, wherein the swivel drive includes a synchronous direct drive.

6. The positioning device according to claim 1, wherein the swivel shaft is swivelable by the swivel drive in a swivel range of less than ±180°.

7. The positioning device according to claim 1, wherein the swivel shaft is swivelable by the swivel drive in a swivel range of less than ±90°.

8. The positioning device according to claim 1, wherein the roller bearing includes two bearing rings made of a metallic material, the rolling elements arranged between the bearing rings.

9. The positioning device according to claim 1, wherein the bearing elements are made of $Si_3N_4$.

10. The positioning device according to claim 1, wherein the position measurement device is configured to perform photoelectric scanning.

11. The positioning device according to claim 1, wherein the position measurement device is configured to perform photoelectric scanning according to an interferential measurement principle.

12. The positioning device according to claim 10, wherein the first part of the position measurement device and a second part of the position measurement device include at least one of (a) transparent phase grating and (b) a reflection phase grating.

13. A positioning device, comprising:
   a swivel shaft including one end configured to attach to an element to be positioned;
   a swivel drive including a rotor movable relative to a stator;
   a position measurement device including two parts movable relative to each other; and
   a roller bearing including a plurality rolling elements, at least a partial number of the rolling elements made of a ceramic material;
   wherein the rotor of the swivel drive and a first part of the position measuring device are connected, fixed against relative rotation, with the shaft; and
   wherein mass centers of the rolling elements are arranged along a circular line, a ratio of a length of a circumference of the circular line to the number of the rolling elements, which are arranged along the circular line, is smaller than 5 mm.

14. The positioning device according to claim 13, the ratio of the length of the circumference of the circular line to the number of the rolling elements, which are arranged along the circular line, is smaller than 3 mm.

15. The positioning device according to claim 13, wherein the swivel drive includes an electrical direct drive.

16. The positioning device according to claim 13, wherein the swivel drive includes a synchronous direct drive.

17. The positioning device according to claim 13, wherein the swivel shaft is swivelable by the swivel drive in a swivel range of less than ±180°.

18. The positioning device according to claim 13, wherein the swivel shaft is swivelable by the swivel drive in a swivel range of less than ±90°.

19. The positioning device according to claim 13, wherein the roller bearing includes two bearing rings made of a metallic material, the rolling elements arranged between the bearing rings.

20. The positioning device according to claim 13, wherein the bearing elements are made of $Si_3N_4$.

21. The positioning device according to claim 13, wherein the position measurement device is configured to perform photoelectric scanning.

22. The positioning device according to claim 13, wherein the position measurement device is configured to perform photoelectric scanning according to an interferential measurement principle.

23. The positioning device according to claim 21, wherein the first part of the position measurement device and a second part of the position measurement device include at least one of (a) transparent phase grating and (b) a reflection phase grating.

* * * * *